United States Patent

[11] 3,631,776

[72] Inventor John P. Burgarella
Sudbury, Mass.
[21] Appl. No. 6
[22] Filed Jan. 2, 1970
[45] Patented Jan. 4, 1972
[73] Assignee Polaroid Corporation
Cambridge, Mass.

[54] PHOTOGRAPHIC CAMERA HAVING BACKUP SYSTEM FOR AUTOMATIC FILM SPEED INSERTION
16 Claims, 5 Drawing Figs.

[52] U.S. Cl. ..................................... 95/10 C, 95/31 FS, 95/11
[51] Int. Cl. ..................................... G01j 1/00
[50] Field of Search .......................... 95/10 C, 31, 31 FS

[56] References Cited
UNITED STATES PATENTS

| | | | |
|---|---|---|---|
| 3,492,927 | 2/1970 | Thiele et al. | 95/10 C |
| 3,524,392 | 8/1970 | Langnau | 95/10 C |
| 3,460,450 | 8/1969 | Ogihara | 95/10 C |
| 3,421,421 | 1/1969 | Hahn | 95/10 C |

Primary Examiner—John M. Horan
Assistant Examiner—Thomas A. Mauro
Attorneys—Brown and Mikulka, William D. Roberson and Gerald L. Smith ABSTRACT: A photographic camera configured to receive a film cassette which supports either thermistors or resistors having resistance values corresponding to film speed. This film speed is automatically inserted into an exposure control system with the insertion of the cassette into a camera. A backup arrangement is provided which inserts a standby resistor element into the system in the instance of an open circuit condition at the camera-cassette resistor unit interface.

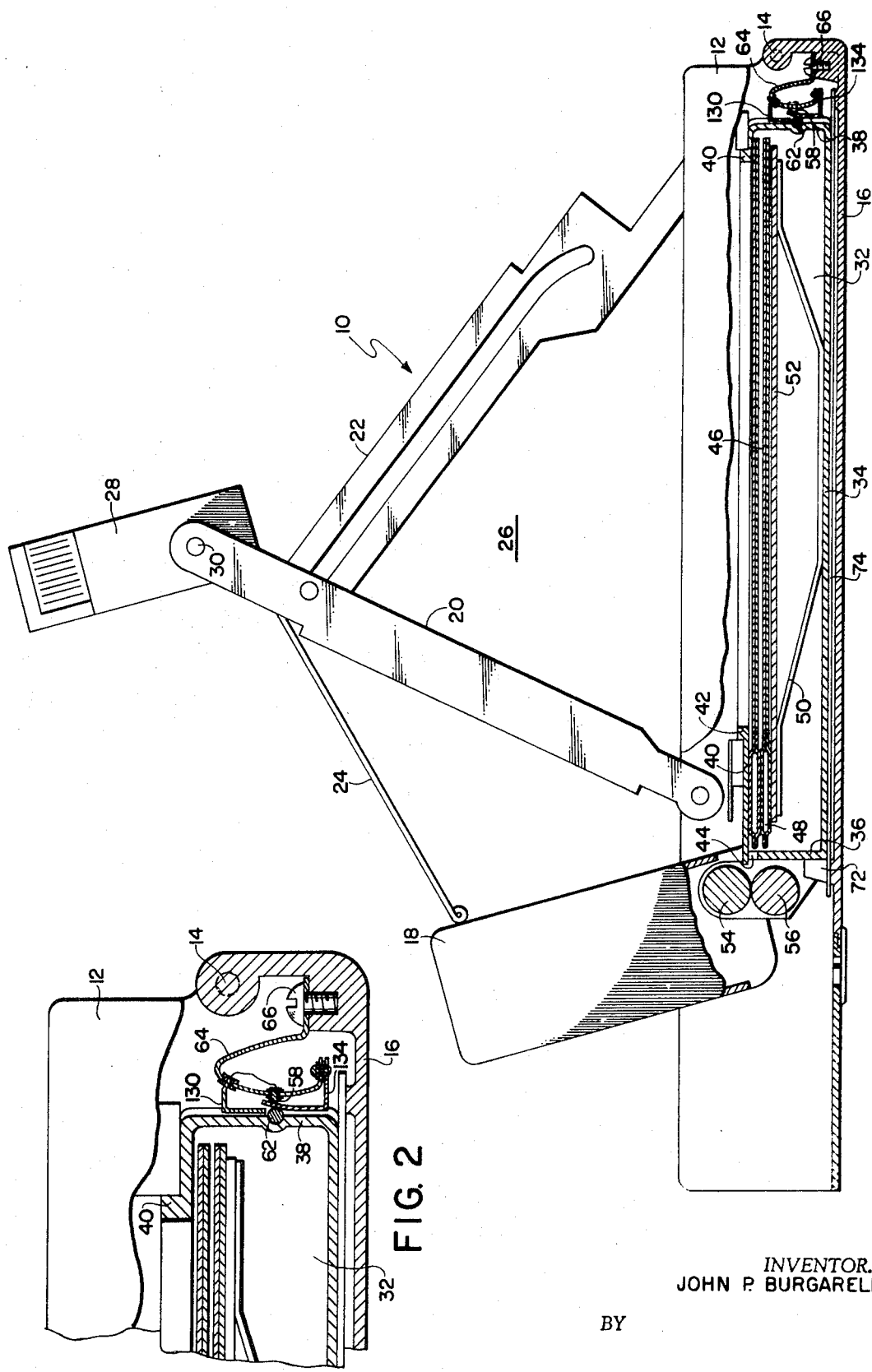

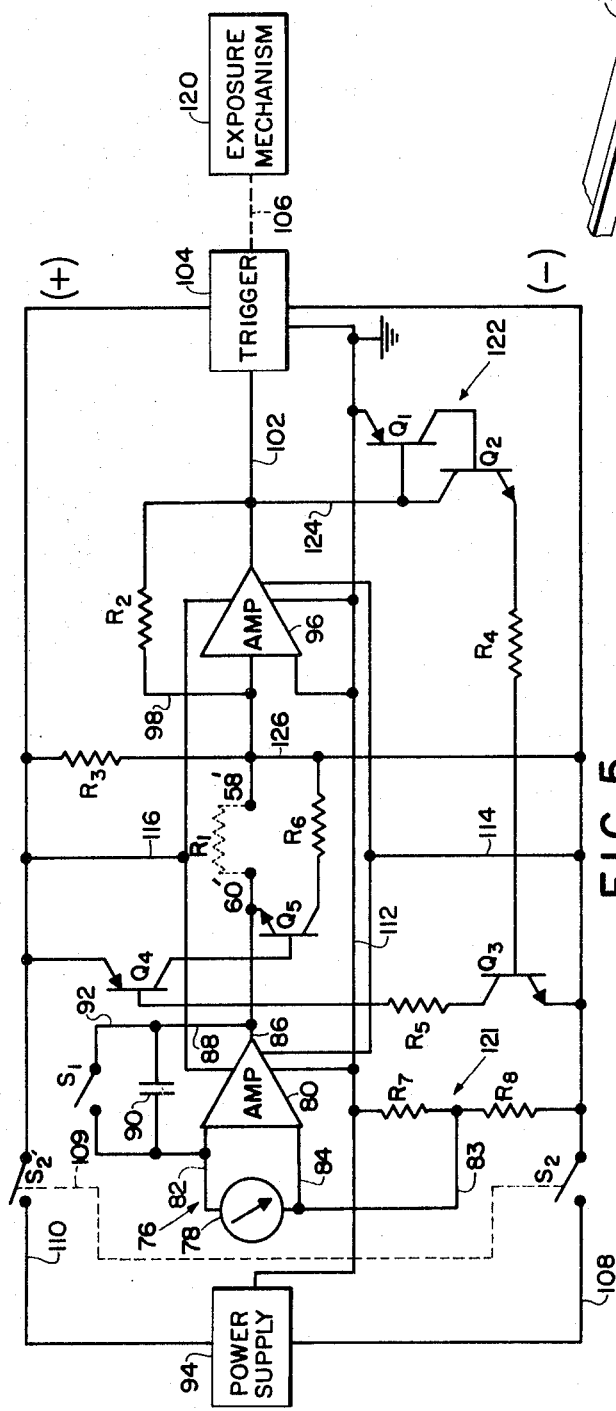

PHOTOGRAPHIC CAMERA HAVING BACKUP SYSTEM FOR AUTOMATIC FILM SPEED INSERTION

BACKGROUND OF THE INVENTION

Photographic cameras are designed to exert select control over the amount and character of an exposure of photosensitive material. To assure a successful exposure various preliminary adjustments must be made to a camera mechanism. These adjustments selectively regulate exposure parameters such as shutter speed and effective lens aperture. A successful exposure will be realized when a camera operator performs all of the necessary steps required to derive an optimum parameter selection.

The photographic industry has sought to lessen the burden of preliminary adjustment imposed upon the camera operator so as to diminish opportunities for aborting exposures. Paramount among the improvements in this field of automation are electronic exposure control systems. These systems evaluate scene brightness, weight this evaluation in light of the sensitometric characteristics of a film being exposed and automatically regulate one or more exposure control parameters in correspondence with the weighted evaluation.

When using these automatic systems, a camera operator may be required to adjust exposure control in accordance with the nominal speed of the film being used in the camera and additionally, in accordance with minor manufacturing variations in the sensitometric properties of the film. The latter corrections usually are provided as printed information on a film container. In photographic cameras of the self-developing variety in which film processing takes place somewhat simultaneously with or immediately following the formation of an exposure, it is desirable that the exposure be trimmed to accommodate for the effect of temperature on processing. If not compensated for, temperature variations may have an adverse effect upon the quality of photograph produced by the system.

When the operator decides to take a photograph, he must make these adjustments to the camera before an adequate exposure may be assured. If, through operator error or mistake, a setting is made incorrectly or not made at all, the exposure may be aborted. The insertion of exposure data would be more effectively handled if done automatically as an adjunct to such basic preparatory steps as inserting the film cassette into the camera.

An arrangement for automatic insertion of film speed and thermal compensation into the exposure system of the camera, through the use of a thermistor fixed to a film cassette, is described in detail in a U.S. Pat. application by Edwin H. Land, Ser. No. 878,086 entitled "Photographic Apparatus Having Automatic Temperature-Compensated Film Speed Insertion" filed Nov. 19, 1969. Another description of a camera and an exposure control system using a tape-type resistor fixed to a film cassette is provided in a copending U.S. Pat. application by Conrad H. Biber, Ser. No. 877,902 entitled "Photographic Apparatus Having Automatic Film Speed Insertion" filed Nov. 19, 1969, both of the above applications being assigned to the assignee of the present application.

In the above-referenced film speed insertion arrangements, a correct placement of a film cassette into the camera is of considerable importance, for until such placement is effectuated typical automatic exposure control systems are inoperable. Correct film cassette placement can be assured by quality mechanical design but this does not resolve the problem of damage or loss of the thermistor or resistor attached to the cassette. Under normal distribution, shipping and useage, cassette structures are susceptible to impact damage which may destroy or damage the impedance elements which are affixed to the cassette. This is particularly true when temperature responsive elements, such as thermistors shaped as a rod or the like are affixed to the cassette. In many instances the materials used for such impedance elements are brittle and easily broken when subjected to harsh operator handling. If such events are not compensated for, the automatic exposure control system will not be in an operable status and correct exposure of the film will not be obtained. To accommodate for such occurrences a backup system would be desirable. Such backup systems should automatically assume the electronic function of a cassette supported impedance element when that element is inadvertently removed or destroyed. Such a system should operate only when the above discussed impedance elements are damaged and film speed or trim insertion connections are not effectuated, thereby assuring adequate exposure where none would have been produced before.

SUMMARY OF THE INVENTION

The present invention is addressed to a photographic camera of a variety of incorporating an electrically powered exposure control system which is adjusted in accordance with the photographic characteristics of a film being exposed by a cassette-mounted impedance element and which includes a backup system which senses the absence of this impedance element and reacts to establish circuit continuity with a backup impedance. As a result, when photographic data provided by a cassette-mounted impedance element is not inserted, the backup impedance will permit acceptable exposure of the film within the cassette and prevent an aborted exposure of film.

In one embodiment, the camera arrangement of the invention is formed incorporating a pair of terminals within its film-receiving chamber. These terminals are positioned so as to make circuit-completing contact with an impedance element, such as a thermistor, attached to the exterior of a film cassette. Thus coupled, the thermistor serves to adjust an electronic exposure control system in accordance with film speed. In the absence of the thermistor or appropriate impedance element, a sensing system will react to establish a reserve or backup equivalent impedance across the terminals. Sensing is electrically accomplished by a subcircuit which responds to an electric operational characteristic of the exposure control system. For instance an amplification stage may react in an identifiable characteristic fashion under open circuit conditions.

The backup impedance is present in the form of a resistor having a resistance value substantially close to that of the impedance element placed upon the cassette and therefore correlative of the impedance element's sensitometric properties when inserted into the exposure control circuit.

In another embodiment, the backup system is present as a mechanical override switching system. With this arrangement, the physical presence of an impedance element upon a cassette structure is mechanically sensed. In the absence of the element, a backup impedance is automatically and mechanically switched for operation with the exposure control of the camera.

It is a further feature and object of this invention to provide an improved photographic camera arrangement which will insure, through the use of electrical, mechanical, or combined systems, an adequately exposed photograph in the eventuality of loss or damage of the impedance element mounted upon a film cassette for camera adjustment purposes.

The invention accordingly comprises the system and apparatus for possessing the features, technique and properties which are exemplified in the description to follow hereinafter and the scope of the invention is indicated in the appended claims.

BRIEF DESCRIPTION OF THE DRAWINGS

FIG. 1 is a side view, partially in section, showing a folding camera of the self-developing variety in its operative position and embodying the instant invention;

FIG. 2 is a fragmentary side view of the camera of FIG. 1 having portions broken away to reveal internal structure;

FIG. 3 is a side cross-sectional view of a mechanical embodiment of the present invention shown in FIG. 4;

FIG. 4 is a fragmentary and exploded view of a cassette structure and corresponding terminal contact member arrangement according to the invention; and FIG. 5 is a schematic circuit diagram of an exposure control system incorporating the sensing arrangement of the present invention.

DETAILED DESCRIPTION

One embodiment of the instant invention is provided with a camera in which sensitometric data including film speed as well as exposure compensation for environmental temperature is automatically inserted into a photographic control system from a temperature-responsive impedance element, such as a thermistor, affixed to a film cassette. The impedance element is arranged to make contact with spring loaded terminal members fixed within a camera housing and the resistor present between these terminal contacts is inserted through appropriate circuitry into the film speed control stage of an automatic exposure control system.

If contact with the impedance element is not made, an open circuit condition exists across the terminals and the exposure system will not function. The system, however, includes a backup function which reacts to an open circuit condition across the terminals and inserts an auxiliary impedance into the system. This impedance may be a thermistor or resistor having nominal resistance values substantially near the values specified for film manufacture. Because typical exposure control circuits are analog in nature, simple switching logic techniques responding to the open circuit condition are not immediately available for inserting the backup impedance.

Referring to FIG. 1, a folding camera of the self-developing variety is portrayed at 10. The housing of camera 10 is shown in its erected position and includes a top supporting section 12 which is hinged at 14 to a bottom cover 16. Hinged to the forward end of the top supporting section 12 is an exposure regulator housing 18. Housing 18 is designed to retain a photographic taking lens, shutter and aperture mechanisms as well as circuits for controlling their actuation.

Camera 10 is erected to the operative position shown by an erecting linkage on either side of the camera, two components of which are shown at 20 and 22. The erecting linkage supports components which define a flexible, lighttight exposure chamber 26 having a top wall as at 24, a rear reflective wall juxtaposed to component 22, and sidewalls (not shown). Linkage 22 is pivotally joined with top supporting section 12 as well as bottom cover 16 at hinge 14. A rangefinder-viewfinder housing 28 is pivotally coupled to erecting linkage component 20 at 30. When collapsed, the camera 10 components are capable of folding substantially within the confines of bottom cover 16. For other details of the camera 10, reference is made to copending U.S. Pat. applications of Irving Erlichman, Ser. No. 824,097, filed May 13, 1969, and Irving Erlichman, Ser. No. 764,142 filed Oct. 1, 1968, both applications being assigned to the assignee of the present application.

Camera 10 is loaded with film by the insertion of a film-retaining cassette 32 into a receiving chamber formed within bottom cover 16. Cassette 32 is of a disposable variety and is formed as a shallow box having a bottom surface 34, sidewalls at 36 and 38, and a forward wall 40. Forward wall 40 is configured defining a film frame opening, the periphery of which is shown at 42. An elongated slot 44 is positioned between sidewall 36 and forward wall 40. Cassette 32 retains a number of film units 46 in position for sequential exposure at film frame opening 42. Film units 46 are fully described in a U.S. Pat. to Edwin H. Land, No. 3,425,644 and each include all of the material necessary to produce a positive photographic print including a photosensitive element, an image receiving element which is transparent and is secured in face-to-face relation with the photosensitive element and a rupturable container 48 of processing liquid which functions to dispense its contents between the layered elements of the unit in response to an applied pressure. Film units 46 are biased upwardly by a spring 50 engaging a platelike member 52 and secured to the bottom portion of the cassette 32. With this arrangement, the uppermost of the film units 46 will be positioned in an orientation for exposure at the film plane of camera 10 within the confines of periphery 42.

Following an exposure of an uppermost film unit 46, the unit is drawn through elongated slot 44 to be engaged by and moved between a pair of pressure applying rolls 54 and 56 which rupture containers 48 and cause a select dispensation of the liquid contents of the containers upon the photosensitive and image-receiving elements of each unit 46.

Looking additionally to FIGS. 2, 3 and 4, cassette 32 is also configured to support a thermally responsive resistor component 62 mounted in a select physical orientation upon sidewall 38. Thermistor 62 is formed having terminal or contact areas 61 and 63 which physically contact respective terminals 58 and 60. Terminals 58 and 60 are resiliently mounted within the receiving chamber by connection with a spring member 64. Contact between the terminals 58 and 60, mounted on spring member 64, and thermistor 62 is assured by a cassette-mounting structure formed within the bottom cover 16. This structure includes spring member 64 which is secured by machine screws 66 to bottom cover 16. Contact members 58 and 60 are rivet shaped and extend through apertures formed within spring member 64. The contacts 58 and 60 are electrically insulated from spring member 64 by electrically insulative inserts as at 68 positioned intermediate the contacts and the hole through which they protrude in spring member 64. Electrical leads as at 70 couple contacts 58 and 60 with the exposure control circuitry of camera 10. Movement of cassette 32 under the bias of spring member 64 is restrained by boss member 72 or similar protuberances defining one terminus of the receiving chamber against which sidewall 36 abuts. With the spring bias arrangement shown, it will be appreciated that the contacting force exerted by contacts 58 and 60 against thermistor 62 will be substantially consistent for all cassette units 32 inserted within the receiving chamber of the camera 10.

The bias exerted by a flat spring 74, positioned on top of the bottom cover 16, assures that the upward facing surface of the uppermost film unit 46 is properly positioned at the film plane of the camera. This arrangement also assures that contacts 58 and 60 will always be relatively positioned with respect to the vertical dimension of sidewall 38. The lateral positioning is accomplished by an abutment of the cassette 32 to one side of bottom cover 16 which urges the other side of cassette 32 into engagement against the inner surface of the corresponding wall of bottom cover 16. Insertion of cassette 32 within the receiving chamber is simplified by virtue of the spring arrangement thus described and is accurate by virtue of the three-axis stationary abutment of three of the surfaces of the cassette with the receiving chamber.

The electrical leads 70, which connect to contacts 58 and 60, lead to an exposure control system as shown in FIG. 5. The resistance present between contacts 58 and 60 is utilized to adjust the automatic exposure control system in accordance with the sensitometric properties of the film being utilized. A detailed description of circuits as illustrated in FIG. 5 may be found in copending U.S. Pat. application for Patent, Ser. No. 837,688, entitled "Exposure Control" by John P. Burgarella, filed June 30, 1969, and assigned to the assignee of the present application.

The circuit may be used to control one or more exposure parameters, however, for the purpose of the present description, an arrangement for controlling shutter interval through an exposure mechanism depicted generally at 120 is described.

The control circuit evaluates scene light levels with a light-sensitive circuit 76. Circuit 76 is characterized in combining photovoltaic cell 78 with a differential amplification stage 80. Photovoltaic cell 78 is oriented upon camera 10 in a position permitting it to witness light from a scene somewhat coincident with the field of view of a camera. Cell 78 is coupled with amplification stage 80 through differential input leads 82 and 84. Amplification stage 80 is one sometimes referred to in the art as an "operational amplifier." When considered ideally, such amplifiers exhibit infinite gain and infinite input impedance and a zero output impedance. The output of amplifier stage 80 is present along line 86 and is coupled with a feedback line 88. Line 88 includes a timing capacitor 90 along with a bypass path 92 incorporating a synchronizing switch $S_1$ for selectively shunting capacitor 90.

With the arrangement shown, photovoltaic cell 78 is capable of forming a desirably linear output. Accordingly, upon application of power to the system, from power source 94, and the opening of synchronizing switch $S_1$, the current output of cell 78 will be integrated at capacitor 90 in a nearly ideal fashion to form a light-responsive output at line 86. The signal at output line 86 from the light-sensing circuit 76 is introduced into a film speed adjust amplification stage 96. At stage 96, the gain of the signal from light-sensing circuit 76 is adjusted in accordance with the sensitometric properties of the film being used with the control system and in accordance with the temperature which the self-developing system is operated. Amplifier 96 may be structured identically with amplification stage 80 and includes an input impedance $R_1$ coupled between terminals 58' and 60' as well as a feedback impedance $R_2$ incorporated within a feedback line 98. Terminals 58' and 60' correspond with the contact members 58 and 60 described in connection with FIG. 1 through 4. Similarly, resistor $R_1$ will be recognized as the impedance element or thermistor 62 fixed to wall 38 of cassette 32.

The arrangement of resistors $R_1$ and $R_2$ in the circuit provides an ideal sensitometric adjustment system. When the resistors are associated with the differential amplifier in the arrangement illustrated, the gain "A" of amplifier 96 closely approximates the negative ratio of the resistance values for resistors $R_2$ and $R_1$, i.e., "$A$"$=R_2/R_1$. It will be observed that the system as set out may be calibrated with one resistor element, for the other, $R_2$ and adjusted for film speed with the other, in this case $R_1$.

The light-responsive control signal, adjusted in accordance with the properties of the film being exposed at stage 96 is directed along line 102 to a trigger circuit 104.

Electrical power is supplied to the circuit from power supply unit 94 along bus lines 108 and 110. The main power switches are shown in bus 108 at $S_2$ and in bus 110 at $S_2'$. The power switches are coupled for simultaneous actuation as shown by dashed line 109. A ground or reference level is provided for the amplification stages 80 and 96 from line 112 emanating from power supply 94 and ending at the trigger mechanism 104. Amplification stages 80 and 96 are shown coupled with power supply lines 108 and 110, respectively, from common connections 114 and 116.

If proper contact is not made at contacts 50' and 60' with the film speed resistor or thermistor $R_1$, the control system will be open circuited and inoperative. To overcome such a contingency, a backup system is provided. This system includes a large bias resistor $R_3$ coupled between bus 110 and the input of amplifier 96. Bias resistor $R_3$ is capable of causing amplifier stage 96 to produce a characteristic negative output signal when resistor $R_1$ is not in circuit. Because of a "common mode" signal arrangement at amplifier stage 80, the characteristic signal which otherwise is produced by amplifier 96 is substantially eliminated when resistor $R_1$ is in circuit and circuit continuity is established. The characteristic output signal from amplifier stage 96 which represents an open circuit condition can be detected by a sensing circuit shown generally at 122. Circuit 122 assumes a conductive state when the output from amplification stage 96 is of the small above-noted characteristic negative value. Conversely, when proper contact is made with the film speed resistor $R_1$, the above-noted characteristic amplifier output signal will be substantially zero. This comes about in the following manner.

Amplification stage 80 can respond to two different types of input signals. Signals applied between terminals 82 and 84 are termed "differential" and cause an output at line 86 with respect to line 112 which is a function of the feedback impedance. If the same signal is applied to both terminals 82 and 84, there will be no differential signal, but there will be a "common-mode" signal. A common-mode signal on line 83 will be applied to line 84 directly and to line 82 through photosensor 78.

A particular common-mode signal can be generated on line 83 with respect to reference line 112 by means of the voltage divider 121 including resistors $R_7$ and $R_8$. If the voltage at the junction of resistors $R_7$ and $R_8$ is minus one volt with respect to reference 112, then the output of amplifier 80 at line 86 will be $-1$ volt with respect to reference 112. The output of an operational amplifier, in the absence of a differential signal, is always at the same potential as the input terminals regardless of the feedback element. In other words, an operational amplifier has unity gain with respect to a common-mode signal. In the case of line 83 and 86 being at $-1$ volt with respect to line 112, an input signal of $-1$ volt is applied to amplifier 96 through resistor $R_1$. The output of amplifier 96 on line 102 will be $(-1 \text{ volt}) (-R_2/R_1)$ or $+(R_2/R_1)$ volts. If a signal is also applied to amplifier 96 through resistor $R_3$, the output caused by this signal will be linearly superimposed on the signal applied through resistor $R_1$. Assume resistor $R_3$ is connected to bus 110 which is at plus three volts with respect to reference line 112. This will cause an output on line 102 equal to $(+3 \text{ volts}) (-R_2/R)$ or $-3(R_2/R_3)$ volts. Assume further the resistance value of resistor $R_3$ is chosen as three times that of $R_1$. Then the output is $-3R_2 3R_1$ or $-(R_2/R_1$ volts. When this voltage is linearly superimposed on the output caused by the signal applied to resistor $R_1$, then the output on line 102 is zero. With zero output on line 102, sensing circuit 122 is not activated and a backup impedance is not inserted into the circuit.

In the situation in which resistor $R_1$ is missing from the film box or not properly contacted by contacts 58 and 60, an open circuit condition will exist across terminals 58' and 60'. Then the only input to amplifier 96 will be through resistor $R_3$ and the output on line 102 will be the negative voltage $-3R_2/R_3$ volts. This voltage forward biases the base-emitter junction of transistor $Q_1$. This causes transistor $Q_1$ collector current to flow, and it flows into the base of transistor $Q_2$. The base current flowing into transistor $Q_2$ causes transistor $Q_2$ collector current to flow. Some of this collector current will come from amplifier 96 and some of it will come from the base of transistor $Q_1$. That portion coming the base of transistor $Q_1$ causes an increase in transistor $Q_1$ collector current which is also transistor $Q_2$ base current. This is a regenerative action and transistors $Q_1$ and $Q_2$ latch in the "on" condition and will remain "on" even when the initiating signal on line 102 has gone to zero.

When transistor $Q_2$ is "on," its emitter current will flow through current limiting resistor $R_4$ into the base of transistor $Q_3$. This base drive will turn transistor $Q_3$ "on." Transistor $Q_3$ collector current will be drawn through current limiting resistor $R_5$ from the base of transistor $Q_4$. The transistor $Q_4$ base current turns "on" that transistor and its collector current provides base drive to a switching transistor $Q_5$. This, in turn, switches "on" transistor $Q_5$, and backup resistor $R_6$ is thus connected into the circuit at line 86 through transistor $Q_5$. Because line 86 changes in potential as a differential signal is applied between lines 82 and 84, the emitter of transistor $Q_5$ will be at a variable potential. Because the base-to-emitter potential has a relatively constant value, this means that the base of transistor $Q_5$ will also be at a variable potential when a differential signal is applied between lines 82 and 84. This condition is satisfied by having the base of transistor $Q_5$ driven from the collector of transistor $Q_4$. It is well known in the art that the collector current of a nonsaturated transistor is substantially independent of the collector-to-emitter voltage. Thus transistor $Q_4$ can provide base drive current to switching transistor $Q_5$ independent of the potential at the base of transistor $Q_5$. Resistor $R_4$, transistor $Q_3$, and resistor $R_5$ constitute a level-shifting arrangement whereby the "on" information existing at the emitter of transistor $Q_2$ is translated to the base of transistor $Q_4$ which is at a substantially different potential.

Resistor $R_6$ may be present as a thermistor having temperature responsive resistance values corresponding with the nominal values of resistance selected for thermistors as at 62.

The preceding embodiment which effectuates the backup technique is of an electrical nature. Similar results may be accomplished through the use of a mechanical embodiment as shown in FIG. 2 through 4. Referring to the latter figures, there is depicted a mechanical arrangement in which a resistor or thermistor having predetermined resistances are placed in circuit under the same circumstances as was the case with the electrical backup system. Through the use of the mechanical system there is placed between contacts 58 and 60 a resistor which will remain in circuit until thermistor or resistor $R_2$ has made connection with contacts 58 and 60. Referring to FIG. 3, representing a side view of the spring member 64 which holds contacts 58 and 60, the mechanical embodiment of the backup system is seen to function on the principle of a resilient spring member which is displaced from its operational position when thermistor 62 makes contact with contacts 58 and 60. In normal operation, the physical connection of thermistor 62 with contacts 58 and 60 establishes the circuit continuity needed for the exposure control system to function properly.

The mechanical embodiment of the invention is formed as a resilient switch assembly which is positioned within the camera 10 in such a manner as to be actuated into an open orientation when cassette 32 is properly positioned and thermistor 62 is intact. The switch is formed having a relatively stiff or inflexible leaf member 130 depending from spring member 64. Connection with spring member 64 is made with an insulative plug assembly 132. Switch leaf 130 cooperates with a resilient spring leaf member 134, which in its free or unrestrained status, abuts against and makes electrical contact with an outer portion of leaf member 130. Leaf member 134 is connected to spring member 64 by a bolt 136 and insulated plug 138. Switch leaf 130 is electrically coupled to contact member 60 through a line indicated in broken fashion at 140. Similarly, leaf member 134 is connected to contact 58 through a line 70 and a resistor or thermistor unit having resistance values corresponding with those of resistor $R_6$ described in connection with FIG. 5. This backup resistor is therefore placed between contacts 58 and 60 and established circuit continuity between them. At such time as thermistor 62 makes proper contact with contact members 58 and 60, it will urge resilient spring member 134 out of engagement with leaf member 130 to remove the backup resistor from circuit. Should thermistor 62 be missing from its proper position upon cassette 32, contact between spring leaf 130 and 134 will be established and a backup resistance inserted across terminal contact member 58 an 60. The mechanical switch is therefore closed at all times unless thermistor 62 is in circuit, thereby assuring the user of circuit continuity in the exposure control system. The spring member 124 will return to its original closed position 1 when the cassette (with the thermistor) is taken out of camera 10.

Since certain changes may be made in the above apparatus without departing from the scope of the invention herein involved, it is intended for all matter contained in the above description or shown in the accompanying drawings shall be interpreted in an illustrative and not a limiting sense.

I claim:

1. A photographic camera configured to receive a cassette incorporating photosensitive material having predetermined sensitometric properties, said cassette further supporting an impedance element having an impedance valve functionally related to said sensitometric properties, comprising:
    a housing having a chamber for receiving said cassette;
    terminal means disposed within said chamber and connectable in continuous circuit relationship with said impedance element when said cassette is inserted in said chamber;
    an electrically powered exposure control system for controlling the exposure of said photosensitive material, connected to said terminal means, responsive to and forming a continuous circuit with the said impedance of said element when said connection is made; and
    means, forming part of said exposure control system sensitive to the absence of said circuit continuity for automatically establishing circuit continuity with an electrical parameter self-contained within said control system.

2. The photographic camera of claim 1 wherein said electrical parameter is present as an impedance having an impedance value substantially near that of said impedance element.

3. The photographic camera of claim 2 in which said impedance is provided by at least one electrically resistive element and said impedance element is present as a resistor affixed to an outer surface of said cassette.

4. The photographic camera of claim 2 in which said impedance is provided by at least one temperature-responsive electrically resistive element and said impedance element is present as a temperature-responsive resistor affixed to an outer surface of said cassette.

5. The photographic camera of claim 1 in which said exposure control system includes:
    an amplification stage coupled with said terminal means and operative to provide characteristic output signals under the influence of said impedance element and to provide different characteristic output signals in the absence of said circuit continuity; and
    said electrical parameter is present as an impedance having an impedance value substantially near that of said impedance element.

6. A photographic camera configured to receive a cassette incorporating photosensitive material having predetermined sensitometric properties, said cassette further supporting an impedance element having an impedance value functionally related to said sensitometric properties comprising:
    a housing having a chamber for receiving said cassette;
    terminal means disposed within said chamber and connectable in continuous circuit relationship with said impedance element when said cassette is inserted in said chamber;
    an electrically powered exposure control system for controlling the exposure of said photosensitive material, connected to said terminal means, responsive to and forming a continuous circuit with the said impedance of said element when said connection is made; and
    means, forming part of said exposure control system including sensing circuit means for sensing the absence of said circuit continuity and providing an output signal representative thereof and switching means actuable in response to said output signal for establishing said circuit continuity with an impedance having an impedance value substantially near that of said impedance element.

7. The photographic camera of claim 6 wherein said sensing circuit means is formed having at least two transistor stages mutually coupled for performance with a latching characteristic.

8. The photographic camera of claim 4 in which said switching means comprises:
    means responsive to said sensing circuit means signal for deriving a steady state output; and
    means responsive to the presence of said steady state output for coupling said impedance with said terminal means to establish said circuit continuity.

9. The photographic camera of claim 2 wherein said means sensitive to the absence of said circuit continuity comprises switch means releasably engageable with said impedance elements when said cassette is positioned within said camera for establishing said circuit continuity when said impedance element is not operatively supported by said cassette.

10. The photographic camera of claim 9 wherein said sensing circuit means is responsive to the polarity of said different characteristic output signals.

11. The photographic camera of claim 9 in which said sensing circuit means is formed having at least two transistor stages mutually coupled for performance with a latching characteristic.

12. The photographic camera of claim 9 in which said switching means comprises:

means responsive to said sensing circuit means signal for deriving a steady state output; and means responsive to the presence of said steady state output for coupling said impedance with said terminal means to establish said circuit continuity.

13. The photographic camera of claim 1 in which said exposure control system includes:

a first amplification means for providing a common mode signal at its output, said output being connectable through said terminal means with said impedance element; and a second amplification means having an input connectable through said terminal means with said impedance element and for providing a characteristic output signal in the absence of said circuit continuity, said characteristic output signal being substantially cancelled by said common mode signal in the presence of said circuit continuity.

14. The photographic camera of claim 13 in which said circuit continuity establishing means comprises:

sensing circuit means for sensing the presence of said characteristic output signal and having an output responding thereto; and switching means sensitive to the said response of said sensing circuit means for establishing said circuit continuity with said impedance.

15. The photographic camera of claim 9 wherein said sensing circuit means is responsive to the polarity of said different characteristic output signals.

16. A photographic camera configured to receive a cassette incorporating photosensitive material having predetermined sensitometric properties, said cassette further supporting an impedance element having an impedance value functionally related to said sensitometric properties, comprising:

a housing having a chamber for receiving said cassette;

terminal means disposed within said chamber and connectable in continuous circuit relationship with said impedance element when said cassette is inserted in said chamber;

an electrically powered exposure control system for controlling the exposure of said photosensitive material, coupled with said terminal means and forming a continuous circuit with said impedance element, said exposure control system including an amplification stage operative to provide characteristic output signals under the influence of said impedance element and to provide different characteristic output signals in the absence of said circuit continuity; and means, forming part of said exposure control system including sensing circuit means for sensing said different characteristic output signals and providing a signal representative thereof, and switching means actuable in response to said sensing circuit means signals for establishing said circuit continuity with an impedance self-contained within said control system and having an impedance value substantially near that of said impedance element.

* * * * *